Sept. 3, 1968    R. R. HENRY    3,399,582

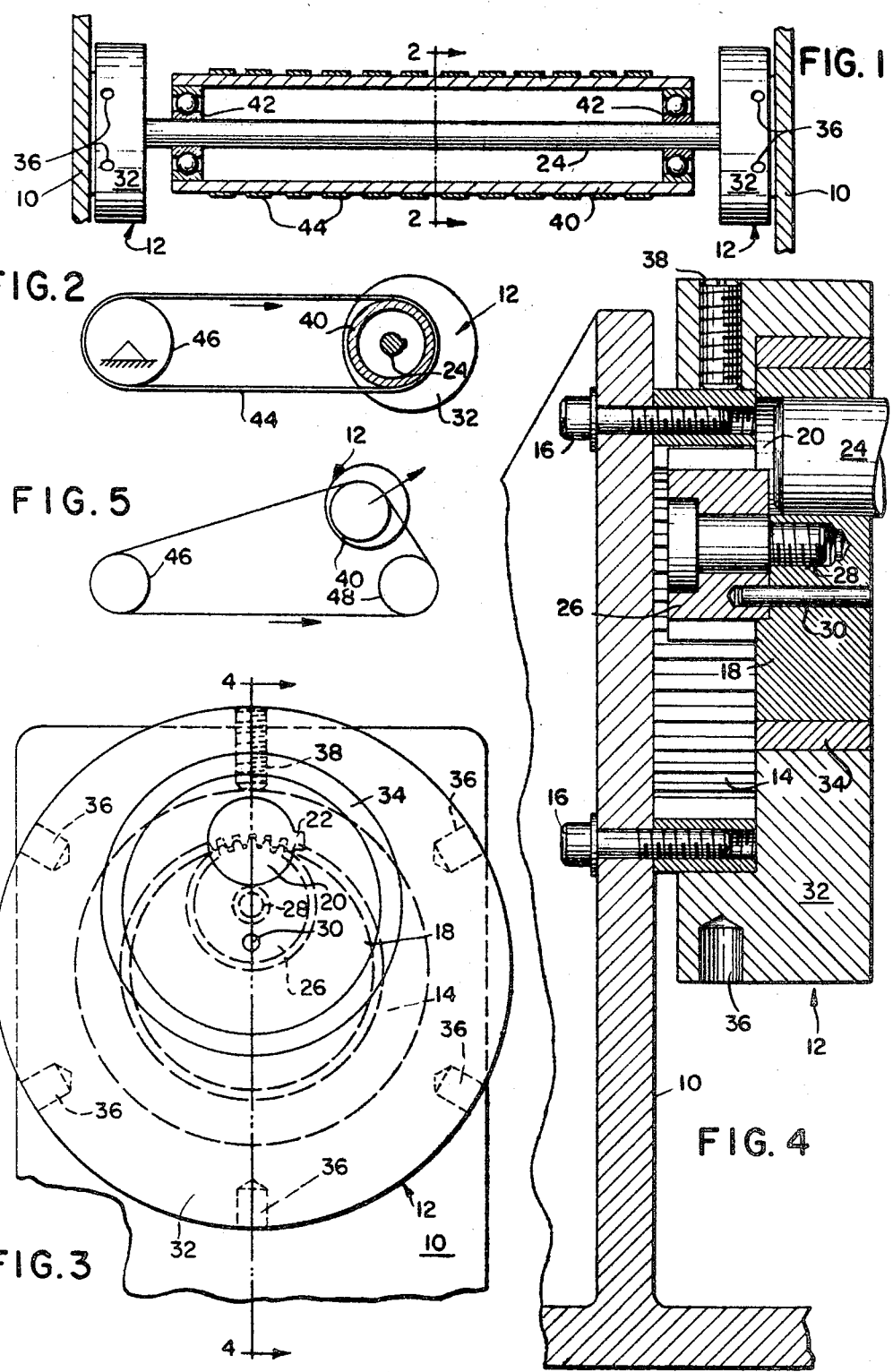

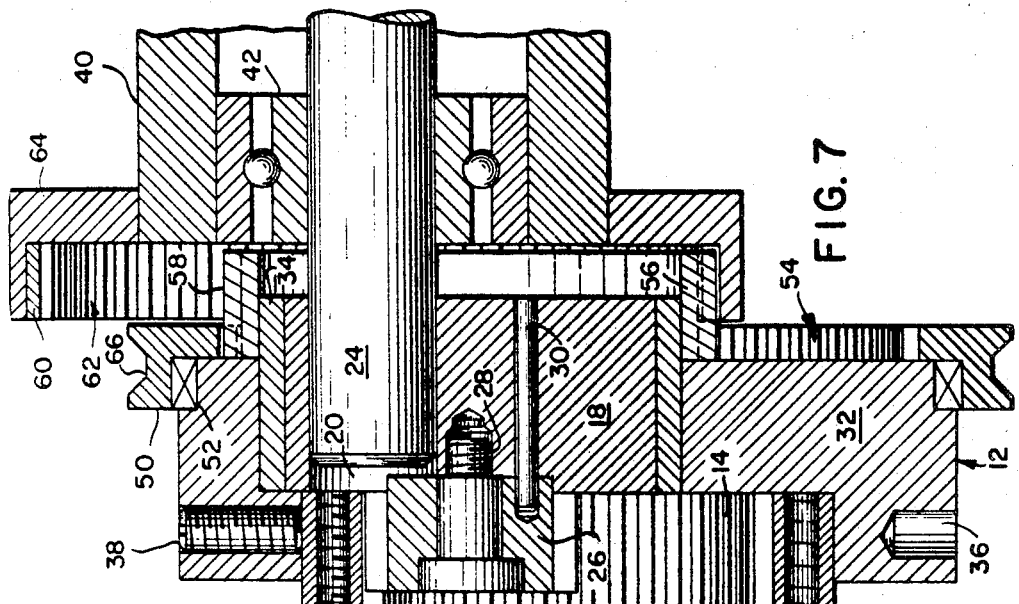
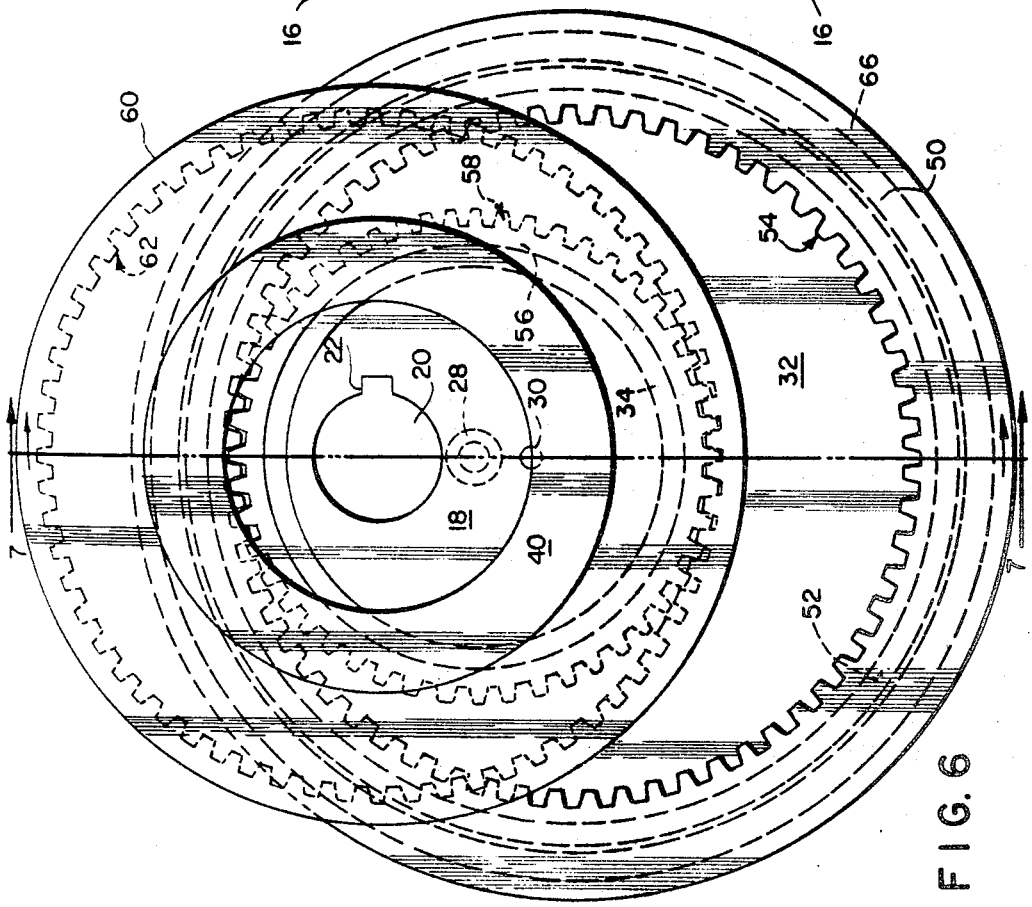

SHAFT ADJUSTMENT APPARATUS AND POWER TRANSMISSION MEANS

Filed Dec. 26, 1967    3 Sheets-Sheet 3

United States Patent Office 3,399,582
Patented Sept. 3, 1968

3,399,582
SHAFT ADJUSTMENT APPARATUS AND POWER TRANSMISSION MEANS
Robert Randall Henry, 100 Elm St., Andover, Mass. 01810
Continuation-in-part of application Ser. No. 521,922, Jan. 20, 1966. This application Dec. 26, 1967, Ser. No. 693,530
36 Claims. (Cl. 74—571)

ABSTRACT OF THE DISCLOSURE

Shaft adjustment apparatus comprising: an internal stationary gear for mounting to a frame, a housing rotatably mounted coaxially of the gear, a pinion engaging the gear and having one-half the diameter thereof, an eccentric rotatable in the housing coaxially of the pinion and secured non-rotatably to the pinion, a shaft support on the eccentric having an axis on the pitch diameter of the pinion, holding means in the shaft support for maintaining a shaft non-rotatable relative thereto; another such apparatus transversely aligned therewith; and a shaft extending therebetween and supported non-rotatably in the shaft supports; whereby on rotation of one housing, the associated pinion is driven by the drive member to rotate the eccentric thereby moving the shaft support linearly and thereby creating a torque at the shaft support axis, transmitted via the shaft, locked by said holding means, to drive the other apparatus thereby to effect simultaneous linear adjustment of both shaft ends. And power transmission means on one of said apparatuses comprising a pair of rotatable internal gears mounted independently rotatably respectively coaxially of said housing and said shaft support and a rotatable external gear mounted independently rotatably coaxially of said pinion, the radii of said rotatable internal gears extending from their respective axes beyond the axis of said rotatable external gear by an equal amount, said amount defining the radius of said rotatable external gear, and said rotatable external gear extending into driving engagement with each of the rotatable internal gears, whereby power may be transmitted between the axes of said housing, shaft support, and pinion regardless of the relative angular positions thereof.

Summary of invention

This application is a continuation in part of prior copending application, Ser. No. 521,922, filed Jan. 20, 1966, for Shaft Adjustment Apparatus and Power Transmission Means, now abandoned.

The invention relates to shaft adjustment apparatus and further relates to apparatus for power transmission between such apparatus and a member rotatable about the shaft.

A principal object of this invention is to provide on one end of a shaft, adjustment apparatus which is adapted for transmitting torque through the shaft to drive similar apparatus on the other end thereof whereby both ends of the shaft may be adjusted simultaneously and without necessity for separately manipulating or securing both ends. A further object of this invention is to provide apparatus in which an applied torque will move each end of a shaft in a predetermined direction and in which the direction of movement may be easily altered.

Other objects of this invention are to provide apparatus which is adapted for either moving a shaft parallel to its axis or for skewing the shaft relative to its axis and which is adapted for moving each end of the shaft linearly perpendicular to its own axis. Another object is to provide such apparatus in which the shaft ends may be simply supported. Still another object is to provide compact means for power transmission between such take-up apparatus and a rotatable member on the shaft where the distance between the shaft axis and one of a pair of apparatus axes is variable, the distance between the shaft axis and the other of the apparatus axes is fixed, and the distance between the pair of apparatus axes is fixed.

This invention features, first, a shaft adjustment unit for operation with a similar unit transversely spaced therefrom and interconnected therewith by the shaft. Each such unit includes a carrier and a rotatable shaft mounting eccentric thereof. Drive means is connected to the mounting member and is responsive to rotation of the carrier for counter-rotation of the mounting member. The shaft is non-rotatably connected to the mounting member eccentrically thereof. Upon rotation of the carrier, counter-rotation is imparted to the mounting member which in turn imparts a torque to the shaft which may be transmitted through the shaft to drive the unit at the other end thereof.

Another feature of this invention is power transmission means. The power transmission means includes a first internal transmission element rotatable coaxially of a reference axis. A second external transmission element, interconnected with the first element, is provided rotatable coaxially about a second axis movable a fixed distance about said reference axis. A third internal transmission element interconnected with the second element is provided rotatable coaxially of a third axis movable a fixed distance about the second axis. The radii of the first and third elements exceed the distance between the axes thereof and the second element axis by an equal amount, which amount functions to define the radius of the second element. The compact transmission thus provided functions to transmit power regardless of the angular positions of the transmission elements or the distance between the shaft and reference axis.

Other objects, features and advantages of this invention will be apparent to those skilled in the art from the following detailed description of preferred embodiments thereof together with the accompanying drawings in which:

FIG. 1 is an elevation partly in section of a system employing the invention;

FIG. 2 is a reduced, partly diagrammatic sectional view along the line 2—2 of FIG. 1;

FIG. 3 is an enlarged end view of an adjustment unit in accordance with the invention;

FIG. 4 is an enlarged sectional view along the line 4—4 of FIG. 3 showing in addition a shaft in the unit;

FIG. 5 is a reduced diagrammatic view of an alternate system employing the invention;

FIG. 6 is an end view of a take-up unit incorporating power transmission means;

FIG. 7 is a sectional view along the line 7—7 of FIG. 6 showing in addition a shaft, a rotatable member thereon, and associated mechanism;

FIG. 9b is a diagrammatic end view of the apparatus shown in FIG. 9a;

FIG. 10b is a diagrammatic end view of the apparatus shown in FIG. 10a;

FIG. 11b is a diagrammatic end view of the apparatus of FIG. 11a;

FIG. 12b is a diagrammatic end view of the apparatus shown in FIG. 12a;

Detailed specification

Figure 8:
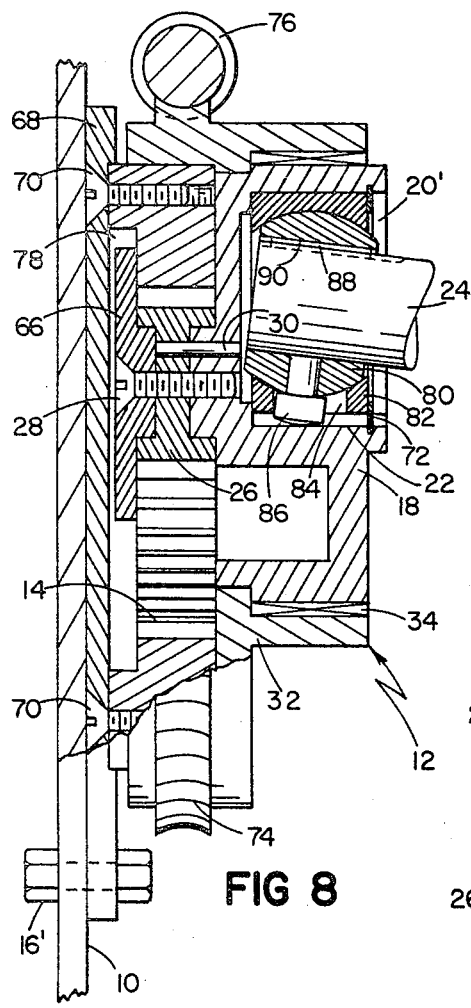
FIG. 8 is a partly sectional view similar to that of FIG. 4 of an alternate preferred embodiment of an adjustment unit in accordance with the invention.

The take-up unit 12 illustrated in FIGS. 3 and 4 includes internally geared drive member 14 which is non-rotatably fastened by bolts 16 to reference base or frame 10.

Mounting member 18 is rotatably positioned beside and eccentrically of drive member 14 with its axis within the pitch diameter of, and parallel to that of, member 14. The axis of mounting 18 is spaced from the axis of drive member 14 by an amount equal to one half the pitch radius thereof. Mounting 18 includes shaft support 20 for non-rotatably receiving shaft 24 with its axis parallel to that of mounting 18. Support 20 in the illustrated embodiment is simply an aperature in mounting 18 for receiving shaft 24. Means are also provided in support 20, in the form of keyway 22, or any other appropriate means for maintaining the shaft non-rotatably in support 20.

Geared pinion 26 extends into drive member 14 and meshes therewith. Pinion 26 is coaxial with mounting 18, is fastened thereto by screw 28, and is fixed for common rotation therewith by pin 30 extending therebetween.

The ratio of the pitch diameter of drive member 14 to that of pinion 26 is 2:1 as also is the ratio of the number of gear teeth of member 14 to that of pinion 26. In this embodiment, also, shaft 24 is positioned in mounting 18 with its axis lying on the pitch diameter of pinion 26.

A carrier 32 for supporting and moving mounting 18 is provided rotatable coaxially of drive member 14. Carrier 32 is mounted rotatably on member 14 and carries mounting 18 rotatable on its own axis in bearing 34. Means are also provided for selectively rotating carrier 32 comprising, in the illustrated embodiment, radial bores 36 for a spanner wrench (not shown).

Finally, means are provided in unit 12 for maintaining the relative position of shaft axis 24 despite loading thereof. As shown in FIG. 4, such means may be provided by set screw 38 engaging the outer surface of member 14.

The alternate preferred embodiment shown in FIG. 8 is substantially similar to that shown in FIGS. 3 and 4. However, in the embodiment shown in FIG. 8, a recess 78 is provided on one side of drive member 14 adjacent frame 10 beyond the periphery of the internal gear thereof. A circular plate 66 fastened coaxially to pinion 26 by screw 28 extends into the recess 78 to secure the mounting member 18, pinion 26, and drive member 14 in carrier 32. A cover plate 68 secured by fasteners 70 to drive member 14 adjacent frame 10 encloses the gears. The unit is fastened to frame 10 by fasteners 16' connected to the cover plate 68.

Instead of set screws 38, the embodiment of FIG. 8 employs a worm gear 74 and worm 76 to maintain shaft 24 in a predetermined position despite loading.

Finally the shaft support 20' in mounting member 18, of the embodiment shown in FIG. 8, is enlarged relative to shaft 24 and has a flexible coupling mounted therein comprising a spherical section 80 mounted in a holder 82 with an internal surface matching the external surface of the spherical section 80. Retaining ring 72 engaging the outer face of holder 82 maintains the coupling in support 20'. An axially extending slot 84 having parallel axial walls is provided in holder 82. Pin 86, having a cylindrical portion fastened in spherical section 80, also has a square portion extending into axially elongated slot 84 and has a width just sufficient to permit an axial slip fit in slot 84. The holder 82 is keyed to support 20' by the square portion of pin 86 which extends beyond slot 84 into keyway 22' in support 20'. Keyway 22' has a width equal to that of slot 84 for a slip fit therein also of the square portion of pin 86. Spherical section 80 is keyed to holder 82 by pin 86 in slot 84 and keyway 20'. And shaft 24, which is coaxially mounted in spherical section 80, is keyed to the spherical section 80 by key 88 in keyway 90 in the spherical section 80.

As shown in FIG. 1, the units 12 are used in pairs in spaced-apart parallel planes, and, in the embodiment shown in FIG. 1, have their corresponding elements in matching rotative positions, preferably transversely aligned. The pairs of units 12 are interconnected by shaft 24 extending thereacross. Shaft 24 may, if desired, include flexible couplings, as shown in FIG. 8, to absorb any misalignment of units 12. Typically a roller 40 on bearings 42 is positioned on shaft 24 with belts or tapes 44 extending about the roller 40.

To adjust the position of shaft 24, set screw 38 is loosened, one of carriers 32 is rotated until the shaft is in the desired position and set screw 38 is tightened again. In the embodiment shown in FIG. 8, adjustment is accomplished simply by rotating worm 76 to in turn rotate the carrier 32. When a set screw is utilized, it may be preferred to provide the screw only on one of a pair of units to avoid the necessity of moving from one unit to the other to make the necessary adjustments of the screws; if a ratchet and pawl arrangement were substituted for the set screws, on the other hand, it might be desired to utilize such means on each unit of the pair; with a worm arrangement as in FIG. 8, the worm is used only on one unit.

Figure 12B:
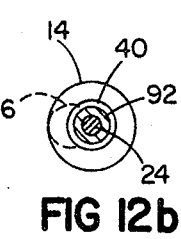
Figure 12A:
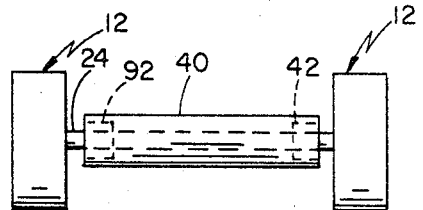
FIG. 12a is a reduced diagrammatic plan view of apparatus having a rotatable member on the shaft and a one way clutch interposed between the member and the shaft.

As shown in FIGS. 12a and 12b, if a roll is rotatably mounted on the shaft 24 and a set screw or ratchet and pawl arrangement is used to maintain position of the axes, a one way clutch 92 may be interposed between the roll 40 and shaft 24. Thus adjustment may be made in such an apparatus by reversing roll 40 rotation to engage clutch 92, to apply torque directly to shaft 24 which in turn transmits the torque to each unit 12 for adjustment thereof.

On rotation of carrier 32, the shaft adjusts as mounting 18 is moved about the axis of drive member 14 causing coaction of member 14 and pinion 26. This action causes rotation of mounting 18 about its own axis and causes a torque to be transmitted through shaft 24 to the other of the pair of units thus causing a corresponding adjustment there. The 2:1 diameter and gear ratios together with the positioning of shaft 24 axis on the pitch diameter of pinion 26 result in shaft 24 describing a straight line as it is adjusted, which is preferred in a simple belt arrangement employing only two rollers 40, 46 as in FIG. 2. If the preferred ratios are not used, the unit may be utilized in an arrangement of three rollers 40, 46, 48 as in FIG. 5. In any event, the general direction of travel of shaft 24 may be adjusted simply by disconnecting pinion 26 from mounting 18, rotating mounting 18 a predetermined amount about its own axis and reconnecting pinion 26 to mounting 18. In the case of a geared pinion 26 and drive 14, the adjustments may be made in increments of a single gear tooth.

In certain applications it is desired to skew a shaft rather than to move the shaft parallel to its axis. In such instances each end of the shaft 24 is mounted in a flexible coupling, as illustrated in FIG. 8. Additionally, to accommodate varying distances between supports 20', the fit of key 88 in keyway 90 may be a slip fit. To provide skewing with the units 12, the phase relationship of the pinions 26 may be varied as in FIGS. 9a and 9b, or 11a and 11b, or different size units 12 may be employed as in FIGS. 10a and 10b.

Figure 9B:
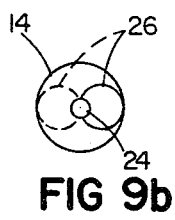
Figure 9A:
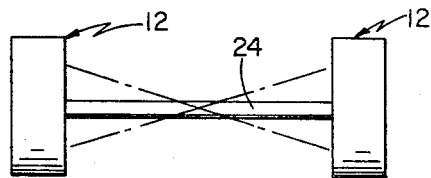
FIG. 9a is a reduced diagrammatic plan view of adjustment units with elements 180° out of phase.

In FIGS. 9a, 9b the pinions of the two units 12 employed are 180° out of phase resulting in a shaft adjustment in one plane in which on adjustment the shaft ends move in opposite directions skewing the shaft 24 about a pivot midway along the shaft. The extremes are indicated in broken lines in FIG. 9a.

Figure 11B:
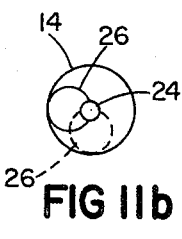
Figure 11A:
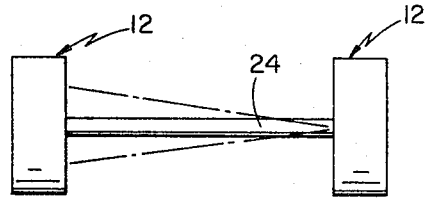
FIG. 11a is a reduced diagrammatic plan view of adjustment units with elements 90° out of phase.

In FIGS. 11a, 11b the pinions are 90° out of phase moving the ends of the shaft 24 in two planes, one vertical, the other horizontal. The extremes in one plane are indicated in broken lines in FIG. 11a. The skewing occurs about pivots at each flexible coupling in each unit 12.

Figure 10B:
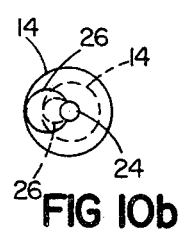
Figure 10A:
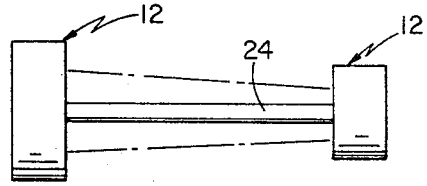
FIG. 10a is a reduced diagrammatic plan view of apparatus employing different size adjustment units.

In FIGS. 10a, 10b the pinions are in phase and the units 12 are coaxial but one is smaller than the other. Skewing occurs in one plane about a pivot beyond the smaller of the units 12. The extremes are shown in broken lines in FIG. 10a.

For transmitting power between roll 40 and unit 12, a gear set is provided as shown in FIGS. 6 and 7.

A first gear 50 is mounted coaxially of drive member 14. As shown in FIG. 7, the first gear may be mounted on bearing 52 on carrier 32 rotatable independently thereof and has an internally geared portion 54 extending to the side of carrier 32. First gear 50 is also provided with means such as V-groove 66 on the outer circumference thereof for transmitting power between said first gear and other rotatable members (not shown). An intermediate gear 56 is positioned coaxially of mounting 18 and is supported rotatably independently thereof on bearing 34. Gear 56 is externally geared, 58, and meshes with gear 50. Roll gear 60 is positioned coaxially of roll 40 and is connected thereto by gear housing 64 which is non-rotatably fastened to each of gear 60 and roll 40. Gear 60 is internally geared, 62, and meshes with intermediate gear 56. The first and roll gears 50, 60 have radii exceeding the distance from the axes thereof to the axis of intermediate gear 56 by an equal amount. Intermediate gear 56 has a radius equal to the amount by which the radii of gears 50, 60 exceed the distance between the axes of gears 50, 60 and that of gear 56. In the preferred embodiment in which the axes of gears 50, 60 are equidistantly spaced from the axis of gear 56, the radii of gears 50, 60 will be equal.

In use, the angular relations of the gear axes and the spacing of first and roll gear 50, 60 may be varied as desired. In the take-up unit illustrated, the gear set provides a practical means of transmitting power to or from roll 40. Ordinarily only one gear set need be used with a pair of units 12.

Figure 13B:
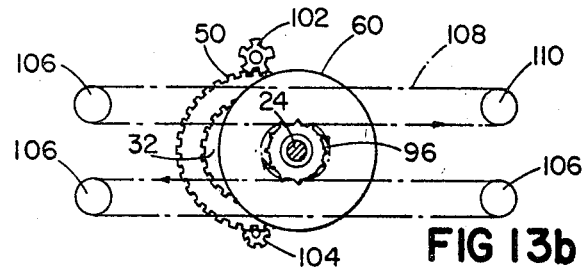
FIG. 13b is a view along the line 13b—13b of FIG. 13a of such apparatus in a sine wave drive arrangement.
Figure 13A:
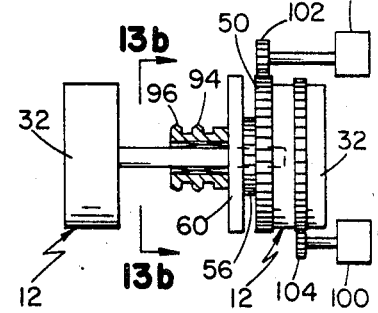
FIG. 13a is a reduced diagrammatic plan view of adjustment units adapted for use in a sine wave drive.
Figure 14:
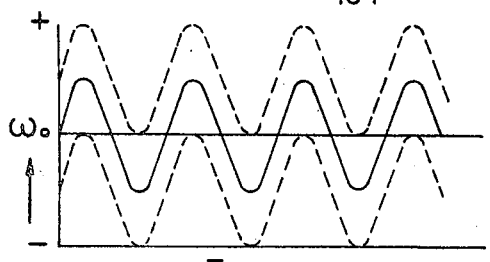
FIG. 14 is a graph of the sine wave function attainable in the arrangement shown in FIG. 13b.

As shown in FIGS. 13a, 13b, the adjustment units 12 may be used in combination with the transmission means to provide a sine wave drive. A sprocket member having a pair of sprocket means 94, 96 is rotatably mounted on shaft 24 and is connected to roll gear 60. A motor 98 is connected via gear 102 to first gear 50, which in this embodiment also is exteriorly geared. Another motor 100 is connected via gear 104 to carrier 32 which is also exteriorly geared. A continuous drive chain 108 extends, as in FIG. 13b, in one direction about sprocket 96 about two idlers 106 spaced to one side of the units 12, thence about another idler 106 and a power take-off 110 spaced to the other side of the units 12 and finally about sprocket 94. The drive is actuated by operating motors 98, 100 and the effect at take-off 110 is illustrated in FIG. 14 in which the rotation ($\omega$) of take-off 110 is plotted as a function of time (T). Thus, on actuation of motor 100 the take-off oscillates as indicated in the solid wave line in FIG. 14. By actuating motor 98, the motion is altered such that, depending on the direction of rotation of motor 98, the wave pattern shifts up or down as indicated in FIG. 14 in broken lines, the extent of such shift being governed by the speed of motor 98. Likewise the frequency of the wave is variable depending on the speed of motor 100. The amplitude of the wave is fixed according to the maximum travel of shaft 24 on rotation of carrier 32.

Other embodiments of this invention will occur to those skilled in the art which are within the spirit and scope of the following claims.

What is claimed is:

1. Shaft adjustment apparatus comprising:
   a carrier rotatable about an axis;
   a mounting member rotatably, eccentrically supported on said carrier;
   a shaft support positioned eccentrically of and connected to said mounting member;
   drive means connected to said mounting member responsive to rotation of said carrier for simultaneous counter-rotation of said mounting member; and
   holding means in said shaft support for maintaining a shaft mounted thereat non-rotatable relative to said shaft support;
   whereby on rotation of said carrier said drive means will cause counter-rotation of said shaft support to shift the position of a shaft thereat and torque will be transmitted through said shaft for driving a similar apparatus on the other end thereof.

2. The apparatus claimed in claim 1 in which the axes of said carrier and said shaft support are equidistantly spaced from the axis of said mounting member and in which the drive ratio of said drive means for counter-rotation of said mounting member relative to rotation of said carrier is 2:1.

3. The apparatus claimed in claim 1 also including an internal transmission element independently rotatably mounted coaxially of said carrier; an internal transmission element independently rotatably mounted coaxially of said shaft support; an intermediate external transmission element independently rotatably mounted coaxially of said mounting member and extending into said internal elements in driving engagement therewith; and means for supporting said transmission elements at said axes for common movement therewith; said internal elements having radii exceeding the distance between the axes thereof and the axis of said intermediate element by an equal amount, and said intermediate element having a radius equal to said amount.

4. The apparatus claimed in claim 3 in which the axes of said carrier and said shaft support are equidistantly spaced from the axis of said mounting member and in which the drive ratio of said drive means for counter-rotation of said mounting member relative to rotation of said carrier is 2:1.

5. Shaft adjustment apparatus comprising:
   a drive member having an internal circular drive surface and adapted for fixed connection to a frame;
   a rotatable mounting member positioned eccentrically of said drive member to one side thereof;
   a pinion positioned coaxially of said mounting member, fixedly connected to said mounting member for common rotation therewith, and extending to and against said drive surface in coacting driving engagement therewith;
   a shaft support positioned eccentrically of and in said mounting member for supporting a shaft on the other side of said mounting member from said drive member;
   means in said shaft support for maintaining a shaft non-rotatable relative thereto; and
   a carrier rotatably positioned coaxially of said drive surface supporting said mounting member thereon rotatably about said mounting member's own axis;
   whereby on movement of said carrier relative to said drive member said pinion and mounting will rotate to shift the position of a shaft on said shaft support relative to said drive member and will transmit a torque about the axis of said shaft for driving a similar unit on the other end of said shaft.

6. The apparatus claimed in claim 5 in which the axes of said drive member, mounting member and shaft support are parallel.

7. The apparatus claimed in claim 6 in which the diameter of said pinion is one half the diameter of said drive surface and the axis of said shaft support lies on the diameter of said pinion.

8. The apparatus claimed in claim 7 in which said drive surface and said pinion have intermeshing gear teeth, the ratio of teeth on said surface to those on said pinion being 2:1.

9. The apparatus claimed in claim 6 also including an internal transmission element independently rotatably mounted coaxially of said carrier; an internal transmission element independently rotatably mounted coaxially of said shaft support; an intermediate external transmission element independently rotatably mounted coaxially of said mounting member and extending into said internal elements in driving engagement therewith; and means for supporting said transmission elements at said axes for common movement therewith; said internal elements having radii exceeding the distance between the axes thereof and the axis of said intermediate element by an equal amount, and said intermediate element having a radius equal to said amount.

10. The apparatus claimed in claim 9 in which the diameter of said pinion is one half the diameter of said drive surface and the axis of said shaft support lies on the diameter of said pinion.

11. Apparatus for simultaneously moving both ends of a shaft for adjustment of the shaft position, comprising:
two shaft adjustment units in spaced apart planes, each having
a rotatable carrier,
a rotatable mounting member supported by said carrier eccentrically to the axis thereof, and
a drive means connected to said mounting member responsive to rotation of said carrier for counter-rotation of said mounting member; and
said shaft extending between and connected eccentrically to and non-rotatably relative to said mounting members,
whereby torque may be transmitted through said shaft for adjusting both shaft ends simultaneously.

12. The apparatus claimed in claim 11 in which in each said unit the axes of said carrier and said shaft are equidistantly spaced from the axis of said mounting member and the drive ratio of said drive means for counter-rotation of said mounting member relative to rotation of said carrier is 2:1.

13. The apparatus claimed in claim 12 in which the elements of each said unit are in matching rotative positions relative to the elements of the other said unit and the drive means of said units are in phase.

14. The apparatus claimed in claim 12 in which the elements of one of said units are proportionately smaller than the corresponding elements of the other of said units.

15. The apparatus claimed in claim 12 in which the elements of each said unit are in non-matching rotative positions relative to the elements of the other said unit and the drive means of said units are out of phase.

16. The apparatus claimed in claim 11 in which each said drive means includes a drive member having a circular internal drive surface and a pinion having an external drive surface in coacting driving engagement with said internal drive surface, said pinion coaxially fixedly connected to one said mounting member for common rotation therewith.

17. The apparatus claimed in claim 16 in which the diameter of said pinion drive surface is one half the diameter of said drive member drive surface and in which the axis of said shaft lies on the diameter of said pinion, the ratio of counter-rotation of each said mounting member relative to rotation of each said carrier being 2:1.

18. The apparatus claimed in claim 17 in which the elements of each said unit are in matching rotative positions.

19. The apparatus claimed in claim 17 in which a flexible coupling is connected to said shaft at each end thereof adapted to transmit torque from said units to said shaft.

20. The apparatus claimed in claim 19 in which the elements of one said unit are proportionately smaller than the corresponding elements of the other of said units.

21. The apparatus claimed in claim 19 in which said pinions are out of phase relative to each other.

22. The apparatus claimed in claim 11 also including, on at least one of said units, an internal transmission element independently rotatably mounted coaxially of said carrier; an internal transmission element independently rotatably mounted coaxially of said shaft support; an intermediate external transmission element independently rotatably mounted coaxially of said mounting member and extending into said internal elements in driving engagement therewith; and means for supporting said transmission elements at said axes for common movement therewith; said internal elements having equal radii greater than the distance between the axes thereof and the axis of said intermediate element and said intermediate element having a radius equal to the amount by which said radii exceed the distance between the axes of said internal elements and the axis of said intermediate element.

23. In combination, a pair of shaft adjustment units and a shaft connected therebetween, said units being positioned in spaced-apart parallel planes and each said unit having in rotative positions matching those of corresponding elements of the other of said units;
a drive member having an internal circular drive surface and adapted for fixed connection to a frame;
a rotatable mounting member positioned eccentrically of said drive member to the side thereof adjacent the other of said units, the axis of said mounting member parallel to that of said drive member;
a pinion positioned coaxially of said mounting member, fixedly connected to said mounting member for common rotation therewith, and extending to and against said drive surface in coacting driving engagement therewith;
a shaft support positioned eccentrically of and in said mounting member, the axis of said support parallel to that of said mounting member and one end of said shaft being connected to and supported by said shaft support;
means at the connection of said shaft and said shaft support for maintaining said shaft non-rotatable relative to said shaft support;
a carrier rotatably positioned coaxially of said drive surface supporting said mounting member thereon rotatably about said mounting member's own axis;
whereby on movement of one of said carriers relative to its associated drive member, the associated pinion and mounting will rotate to shift the position of said shaft on the associated shaft support relative to said associated drive member and will transmit a torque about the axis of said shaft which will drive the other of said units for a corresponding adjustment.

24. The apparatus claimed in claim 23 including means connected to one of the rotatable elements of one of said units for selectively maintaining the position thereof relative to the other elements thereof.

25. The apparatus claimed in claim 24 including in at least one of said units means on said carrier for the application thereby of a force for rotating said carrier about its own axis.

26. The apparatus claimed in claim 23 in which the diameter of said pinion is one half the diameter of said drive surface and the axis of said shaft support lies on the diameter of said pinion.

27. The apparatus claimed in claim 26 in which said drive surface and said pinion have intermeshing gear teeth, the ratio of teeth on said surface to those on said pinion being 2:1.

28. The apparatus claimed in claim 26 also including, on at least one of said units, an internal transmission element independently rotatably mounted coaxially of said drive member; an internal transmission element independently rotatably mounted coaxially of said shaft support; an intermediate external transmission element independently rotatably mounted coaxially of said mounting member and extending into said internal elements in driving engagement therewith; and means for supporting said transmission elements at said axes for common movement therewith; said internal elements having equal radii greater than the distance between the axes thereof and the axis of said intermediate element and said intermediate element having a radius equal to the amount by which said radii exceed the distance between the axes of said internal elements and the axis of said intermediate element.

29. The apparatus claimed in claim 28 in which said drive surface and said pinion have intermeshing gear teeth, the ratio of teeth on said surface to those on said pinion being 2:1, and in which said internal and external transmission elements also have intermeshing gear teeth.

30. The apparatus claimed in claim 29 in which said carrier is a housing mounted rotatably concentrically on the outer portion of said drive member and has an eccentric opening therein in which said mounting member is rotatably positioned; in which said internal elements are respectively mounted on said carrier and said shaft and said intermediate element is mounted on said mounting member; and in which said corresponding elements are transversely aligned.

31. In apparatus having three parallel axes relatively movable, one of said axes intermediate and spaced a predetermined fixed distance from the other said axes, means for transmitting power between said axes continuously regardless of the relative positions thereof comprising:

a pair of power transmission elements in parallel spaced planes, each respectively being rotatably mounted coaxially of one of the said other axes for movement therewith, said elements having circular internal drive surfaces of radii exceeding the distance between their respective axes and said intermediate axis by an equal amount; and an intermediate power transmission element having a circular external drive surface with a radius equal to said amount, said intermediate element rotatably mounted coaxially of said intermediate axis for movement therewith, extending axially between said pair of elements, and drivingly engaging said drive surfaces of said pair of elements;

whereby said drive surfaces are maintained in driving engagement for transmitting power between said axes regardless of their relative positions.

32. The structure claimed in claim 31 in which said surfaces are geared.

33. The structure claimed in claim 32 in which said axes have other rotatable members positioned thereat and said elements are mounted for rotation independently thereof.

34. The structure claimed in claim 31 in which said intermediate axis is spaced equidistantly from the other said axes and said internal surfaces have equal radii.

35. The structure claimed in claim 34 further including a carrier coaxially positioned relative to one of said pair of elements; a mounting member rotatably supported on said carrier coaxially of said intermediate element, the other of said pair of elements independently rotatably supported by said mounting member eccentrically thereof; and drive means connected to said mounting member responsive to rotation of said carrier for counter-rotation of said mounting member in a 2:1 ratio of counter-rotation of said mounting members relative to rotation of said carrier.

36. The structure claimed in claim 35 further including one power source drivingly connected to said carrier and another power source drivingly connected to said one of said pair of elements.

References Cited

UNITED STATES PATENTS

| | | | |
|---|---|---|---|
| 1,141,539 | 6/1915 | Greer et al. | 74—242.16 |
| 1,198,869 | 9/1916 | Pierce | 74—397 X |
| 1,408,439 | 3/1922 | Buckminster. | |
| 1,467,591 | 9/1923 | Riker | 74—242.16 |
| 1,523,676 | 1/1925 | Trussell | 74—242.16 |
| 1,713,272 | 5/1929 | Eason et al. | 74—397 |
| 2,108,384 | 2/1938 | Moisy | 74—804 |
| 2,166,406 | 7/1939 | Henry | 74—242.16 |
| 2,180,449 | 11/1939 | Wilson | 74—242.16 |
| 2,181,735 | 11/1939 | Moore | 74—397 |
| 2,621,530 | 12/1952 | Siegerist | 74—242.16 |
| 2,892,360 | 6/1959 | Ill | 74—571 |
| 3,077,159 | 2/1963 | Ward et al. | |

FOREIGN PATENTS

| | | |
|---|---|---|
| 486,889 | 11/1929 | Germany. |
| 942,376 | 9/1948 | France. |

FRED C. MATTERN, Jr., *Primary Examiner.*

J. A. WONG, *Assistant Examiner.*